United States Patent [19]

Guens et al.

[11] Patent Number: 4,557,293

[45] Date of Patent: Dec. 10, 1985

[54] ARRANGEMENT FOR CONTROLLING AN ELECTRO-HYDRAULIC VALVE

[75] Inventors: Guy Guens, Hemhofen; Karl Krieger, Wuppertal, both of Fed. Rep. of Germany

[73] Assignee: Hermann Hemscheidt Maschinenfabrik GmbH & Co., Wuppertal, Fed. Rep. of Germany

[21] Appl. No.: 518,128

[22] Filed: Jul. 29, 1983

[30] Foreign Application Priority Data

Aug. 11, 1982 [DE] Fed. Rep. of Germany ....... 3229835

[51] Int. Cl.4 ............................................. F16K 31/06

[52] U.S. Cl. ................................ 137/625.65; 251/77; 251/129.02

[58] Field of Search ..................... 137/625.65; 251/77, 251/129, 141

[56] References Cited

U.S. PATENT DOCUMENTS 3,970,282 7/1976 Hansen ............................... 251/129

4,008,876 2/1977 Bastle ............................. 251/141 X 4,412,557 11/1983 Schmid ............................ 251/77 X

*Primary Examiner*—Robert G. Nilson

*Attorney, Agent, or Firm*—Berman, Aisenberg & Platt

[57] ABSTRACT

An arrangement for controlling an electro-hydraulic valve having an armature of the magnet which performs a greater displacement stroke than the closure body of the valve and, following on the switching movement of the valve, initially tensions a spring buffer arranged between the armature and a push-rod switch. The armature rests directly in contact against a housing of the valve in the switched position, thus generating a remanence force, and, after completion of switching, the voltage applied to the coil of the magnet is reduced by electronic means to an extent such that the closure body of the valve is held in the switched position by the combined magnetic force induced by the reduced residual voltage and the remanence force. The initially-tensioned spring buffer, on switching off the residual voltage, generates an air-gap which eliminates the remanence force between the housing and the armature so that the closure body of the valve is then returned to the starting position by the valve force.

4 Claims, 2 Drawing Figures

ARRANGEMENT FOR CONTROLLING AN ELECTRO-HYDRAULIC VALVE

Figure 1:
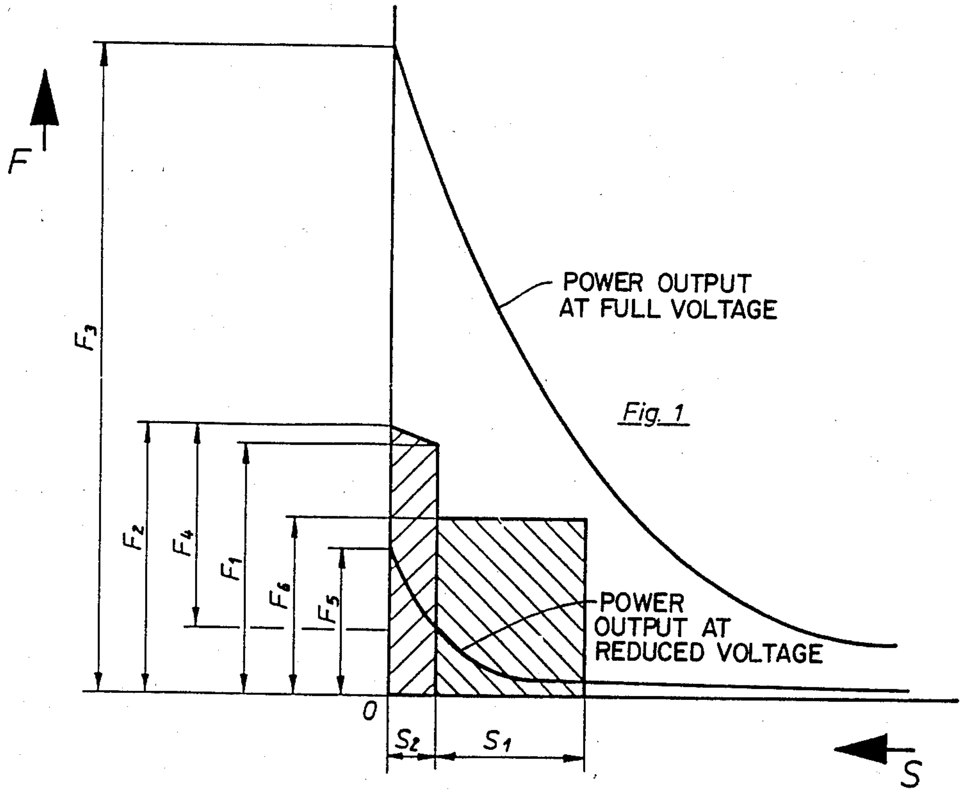

This invention relates to an arrangement for controlling an electro-hydraulic valve, especially a control valve for use with self-advancing hydraulic mine-roof supports, comprising an electro-magnet, with an armature and coil, connected to an intrinsically-safe electric circuit, and an hydraulic 2-position, 3-port directional valve having a closure body which is held in a starting position by valve force means and which is movable into a switched position via a push-rod switch device by the armature of the magnet.

The underlying problem with which the invention is concerned is shown by the following example relating to mining.

In mining operations, hydraulic self-advancing mine-roof supports are used for the long-wall underground working of mineral deposits such as coal, which supports, in juxtaposition to each other, advance automatically along with the advancing coal-winning machinery. For this purpose, height-adjustable hydraulic props, movement-effecting hydraulic cylinders and other hydraulic rams or cylinders are provided in the supports to perform various different functions. The supply of pressurised hydraulic fluid for these hydraulic mechanisms often ensues via control valves which, in their turn, are switched by hydraulically- or electrically-actuated preliminary control valves. With electrically-operated control mechanisms, the electrical switching coils of the valves must be made safe by intrinsically-safe electrical circuits because of the danger of firedamp that is always present during underground mining and especially during the mining of mineral coal. The magnetic forces generated by an intrinsically-safe voltage, however, exert only a small switching force so that it is necessary to ensure that the valve force holding the valve in the starting position is matched correspondingly. As the full electrical power is always needed for switching the valve, it is not possible to switch more than one electro-magnet simultaneously with an intrinsically-safe electrical circuit. However, this is often required during mining operations and, consequently, it is necessary to provide a plurality of intrinsically-safe circuits, the outlay for the electrical separation of the intrincially-free circuits being quite considerable.

The present invention is accordingly directed to the aim of creating an arrangement with which more than one electro-hydraulic valve can be controlled simultaneously using just one intrinsically-safe electrical circuit.

With this aim in view, the invention is directed to an arrangement of the construction set forth in the opening paragraph of the Specification with the armature being adapted to perform a greater displacement stroke than the closure body of the valve and being arranged to initially tension a spring buffer arranged between the armature and the push-rod switch following on switching movement of the valve, the arrangement also having a housing of the valve against which the armature rests in direct contact when the valve is in the switched position so as to generate a remanence force, and electronic means connected to the coil of the electro-magnet so that, after completion of switching, the voltage applied to the coil is reduced by the electronic means to an extent such that the closure body of the valve is held in the switched position by the combined magnetic force induced by the reduced residual voltage and the remanence force, the initially-tensioned spring buffer, on switching off the residual voltage, serving to generate an air-gap which eliminates the remanence force between the housing and the armature whereby the closure body of the valve is returned to the starting position by the valve force.

In an electro-hydraulic valve according to the invention, a remanence force is generated during switching and, after the switching operation, a reduced voltage is applied to the coil of the electro-magnet. The remanence force is utilised for holding the electro-magnet or the valve in the switched position with an appreciably-reduced voltage, giving the advantage that the excess energy of the intrinsically-safe circuit can be used for switching additional electro-magnetic valves. Thus, for example, with an hydraulic self-advancing mine-roof support asssembly, several functions can be carried out simultaneously. During switching, a spring buffer between the armature and the push-rod switch of the valve is simultaneously initially tensioned. This buffer, after switching-off of the applied residual voltage, overcomes the remanence force, and so the valve is switched back into the starting position by the once more freely-acting valve force.

Figure 2:
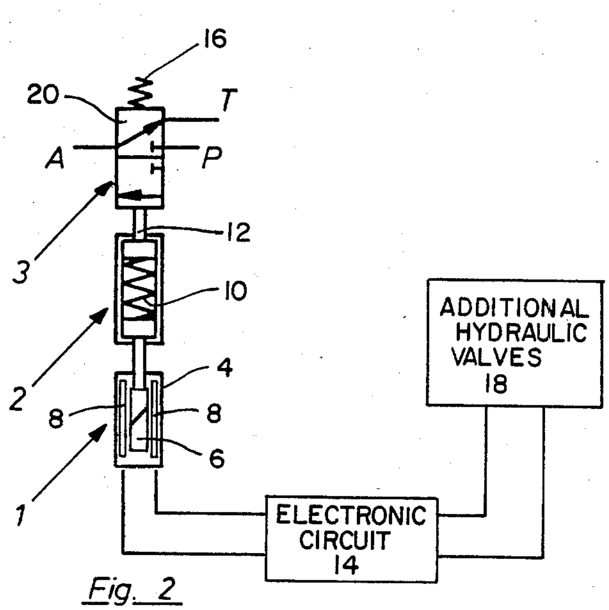

An example of an electro-hydraulic valve arrangement according to the invention is shown in the accompanying drawing, in which FIG. 1 shows the power output diagram of the electro-hydraulic valve in the form of the force F plotted as a function of the path-length of switching S; and FIG. 2 shows the electro-hydraulic valve diagrammatically with the electro-magnet denoted by 1, the initially-tensioned spring buffer by 2, and the spring-loaded 3-port 2-position directional valve by 3.

Electro-magnet 1 includes a housing 4, armature 6, and coil 8, which are of conventional construction. A spring 10, provided with a soft spring constant, comprises an initially-tensioned spring buffer 2 arranged between the electro-magnet 1 and the valve 3. Push-rod switch 12 connects spring 10 to a movable closure body of the 3-port 2-position directional valve 3. The directional valve 3 connects a union A alternately to a high-pressure connection P and a low-pressure connection T.

In the power output graph shown in FIG. 1, the following symbols are used for the variables stated:

$F_1$=initially-stored force in the spring buffer;
$F_2$=force in the further initially-tensioned spring buffer;
$F_3$=magnetic force at full voltage;
$F_4$=remanence force;
$F_5$=magnetic force at reduced voltage;
$F_6$=valve force;
$S_1$=valve displacement stroke; and
$S_2$=spring buffer displacement stroke.

The upper line in FIG. 1 represents the power output curve of the electro-magnet at full voltage, while the lower line is the power output at reduced voltage.

Switching of the electro-hydraulic valve 3 is introduced by excitation of coil 8 of electro-magnet 1 with the full electrical power of an intrinsically-safe electronic circuit 14. In the starting position, the switching force acting on armature 6 is approximately zero. However, the magnetic force increases rapidly with the displacement stroke of the armature as the air-gap beween the upper end of coil 6 and the housing 4 diminishes. The valve 3 is switched because the force $F_1$ stored in the spring buffer 2 is greater than the valve force $F_6$, illustratively created by spring (6) holding the valve-closure body 20 in the starting position, for example in the closed position. After the displacement stroke $S_1$, the armature 6 carries out a residual displacement stroke $S_2$ as the magnetic force increases. However, as the soft spring 10 in the spring buffer 2 is initially-tensioned further only after switching of the valve 3 along a comparatively short path-length, the pressure per unit area transmitted to the valve closure body 20 and the valve seat of valve 3 increases only slightly.

In the switched position at the end of the switching process, the upper end of armature 6 comes to rest in direct contact with housing 4 so that a remanence force is generated by a magnetic attraction between armature 6 and housing 4. Thereupon, the voltage of the intrinsically-safe circuit 14 applied to the magnetic coil 8 is reduced to a value such that the sum of the residual reduced magnetic force $F_5$ of coil 8 and armature 6, and the remanence force $F_4$ of armature 6 and housing 4 exceeds the force $F_2$ of the spring buffer acting in the opposite sense. Valve spring 16 continues to exert a closing force ($F_6$) once the valve has been moved into its open position. The force, however, is not sufficient to move the valve back to its original starting position when the reduced magnetic force $F_5$ combined with the remanence force $F_4$ are acting to hold the valve open. Consequently, the valve closure body 20 is held reliably in the switched position with an appreciably-reduced expenditure of energy. The energy released can be utilised to connect a plurality of electro-hydraulic valves, shown illustratively at 18, to the intrinsically-safe circuit 14 and switch them simultaneously.

After switching, the valve closure body 20 is held open by the magnetic force $F_5$ attained at reduced power acting together with the remanence force $F_4$ against the force $F_2$ in the initially-tensioned spring buffer. As soon as the voltage on the magnet coil 8 is switched off, the force $F_2$ in the spring buffer 2 lifts the armature, now held only by the remanence force $F_4$, from the housing and an air-gap is formed, so that the remanence force collapses. Now only the valve force $F_6$ (created by spring 16) acts on the closure body 20 of the valve and returns the closure body 20 into the starting position of the valve 3.

We claim:

1. An electro-hydraulic valve assembly, especially a valve assembly for controlling self-advancing hydraulic mine-roof supports, comprising an electro-magnet with a movable armature and with a coil connected to an intrinsically-safe electrical circuit, an hydraulic directional valve having a movable valve-closure body which is held in a starting position by spring force means and which is movable into a switched position via a push-rod switch device against the force of the spring force means by the armature of the electro-magnet when the coil thereof is supplied with the full electrical power of the circuit, the armature being adapted to perform a greater displacement stroke than the closure body of the valve and being arranged to further stress a pre-stressed spring buffer arranged between the armature and the push-rod switch following on switching movement of the valve, a housing of the electro-magnet against which a surface of the armature rests in direct contact when the valve is in the switched position so as to generate a remanence force, and electronic means connected to the coil of the electro-magnet so that, after completion of the switching, the voltage applied to the coil is reduced by the electronic means to a value where the magnetic force acting on the armature is weaker than the force of the spring force means, the closure body of the valve being held nonetheless in the switched position by the now-weaker magnetic force induced by the reduced residual voltage combined with the remanence force, the further-stressed spring buffer, on switching-off the residual voltage, being sufficiently strong to move the armature towards its initial starting position and, therefore, to produce an air-gap between the magnet housing and the armature which eliminates the remanence force whereby the valve-closure body is returned to the starting position by the spring force means.

2. An electro-hydraulic valve assembly according to claim 1, in which the spring buffer has a small spring constant.

3. An electro-hydraulic valve assembly according to claim 2, in which the force stored in the spring buffer after switching is greater than the remanence force but is smaller than the magnetic force acting during switching prior to reduction of the voltage by the electronic means.

4. An electro-hydraulic valve assembly according to claim 1, in which a plurality of electro-hydraulic valves are connected to the intrinsicially-safe electrical circuit and are adapted to be controlled simultaneously.

* * * * *